(12) United States Patent
Joshi

(10) Patent No.: US 7,708,966 B2
(45) Date of Patent: May 4, 2010

(54) SYSTEMS AND METHODS FOR ON-SITE SELECTIVE CATALYTIC REDUCTION

(75) Inventor: Ashok V. Joshi, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 129 days.

(21) Appl. No.: 12/025,423

(22) Filed: Feb. 4, 2008

(65) Prior Publication Data

US 2009/0196810 A1  Aug. 6, 2009

(51) Int. Cl.
   *B01D 53/56* (2006.01)
   *B01D 53/74* (2006.01)
   *C01C 1/00* (2006.01)

(52) U.S. Cl. .............. 423/213.2; 423/239.1; 423/352; 423/359; 423/362; 423/DIG. 5; 422/148; 422/168; 422/169; 422/170; 422/171; 422/172; 422/177; 422/180; 60/276; 60/282; 60/299; 60/301

(58) Field of Classification Search .............. 423/213.2, 423/239.1, 352, 359, 362, DIG. 5; 60/276, 60/282, 299, 301; 422/148, 168–172, 177, 422/180
   See application file for complete search history.

(56) References Cited

U.S. PATENT DOCUMENTS

| 5,993,761 | A | 11/1999 | Czernichowski et al. |
| 6,007,742 | A | 12/1999 | Czernichowski et al. |
| 6,620,398 | B2 * | 9/2003 | Kindig et al. ............... 423/359 |
| 7,402,292 | B2 * | 7/2008 | Hemingway et al. ...... 423/239.1 |
| 2004/0088970 | A1 * | 5/2004 | Mulligan ...................... 60/286 |
| 2004/0237507 | A1 * | 12/2004 | Duvinage et al. ............. 60/276 |
| 2005/0247050 | A1 * | 11/2005 | Kaboord et al. ............... 60/286 |
| 2006/0075743 | A1 * | 4/2006 | Li et al. ......................... 60/286 |
| 2006/0266021 | A1 * | 11/2006 | Robel et al. ................... 60/285 |
| 2007/0074506 | A1 * | 4/2007 | Driscoll et al. ................ 60/286 |
| 2008/0299016 | A1 * | 12/2008 | Sobolevskiy et al. ........ 422/171 |
| 2009/0145114 | A1 * | 6/2009 | Sato et al. ..................... 60/286 |

OTHER PUBLICATIONS

Busca, Guido et al., "Chemical and mechanistic aspects of the selective catalytic reduction of NOx by ammonia over oxide catalysts: A review", *Applied Catalysis B: Environmental*, 18 (1998), 1-36.
Acke, Filip et al., "Comparison between ammonia and propene as the reducing agent in the selective catalytic reduction of NO under lean conditions over Pt black", *Applied Catalysis B: Environmental*, 20 (1999), 133-144.

* cited by examiner

*Primary Examiner*—Timothy C Vanoy
(74) *Attorney, Agent, or Firm*—David Fonda

(57) ABSTRACT

A selective catalytic reduction (SCR) system includes an on-board ammonia generation system that produces nitrogen from air and hydrogen from a source of a hydrogen-containing compound, and generates an ammonia product from the nitrogen and hydrogen to provide the ammonia product into an exhaust from a $NO_x$ generator to reduce the $NO_x$ in the exhaust. Oxygen from one or both of the nitrogen generator and the hydrogen generation cell can be supplied to the $NO_x$ generator for cleaner combustion or to a particulate filter for cleaning the filter. $H_2O$ from the $NO_x$ generator can at least partially provide a water source for the hydrogen generation cell.

36 Claims, 3 Drawing Sheets

SYSTEMS AND METHODS FOR ON-SITE SELECTIVE CATALYTIC REDUCTION

BACKGROUND

Combustion engines, such as those used in power plants and motor vehicles, emit substances that are harmful to the environment, including nitrogen oxide. Nitrogen oxides such as nitric oxide (NO) and nitrogen dioxide ($NO_2$) are extremely toxic. Nitric oxide and nitrogen dioxide are often present when nitrous oxide ($N_2O$) is produced during combustion.

When $NO_x$ and volatile organic compounds react in the presence of sunlight they form photochemical smog. This smog is a significant form of air pollution, especially in the summertime. Children, people with lung diseases, such as asthma, and people who work or exercise outside are susceptible to adverse effects of smog such as damage to lung tissue and reduction in lung function. Also, $NO_x$ forms nitric acid when dissolved in atmospheric moisture, forming a component of acid rain. As is well known, acid rain causes negative visual and physical affects to buildings and other structures. Furthermore, any unnatural level of nitric acid in the environment due to acid rain is undesirable.

There are conventional ways to remove $NO_x$ such as by filtering, absorption, and/or catalytic reactions. In order to remove $NO_x$ from emissions of internal combustion engines, one of the conventional methods is selective catalytic reduction (SCR), which is conventionally used for diesel engines, for example.

Conventional applications of SCR to reduce $NO_x$ emissions for motor vehicles include injection of ammonia supplied from a tank of liquid ammonia or urea (a major component of which is ammonia) into the emissions stream of the diesel engines. However, the liquid ammonia supply has to be maintained and replenished. Planning and performing periodic maintenance to check and replenish urea supplies is costly and, hence, can be dismissed, despite the negative environmental effects of $NO_x$ emissions

SUMMARY

Embodiments of a system are described. In one embodiment the system is a selective catalytic reduction (SCR) system. An embodiment of the SCR system includes a $NO_x$ generator and an on-board ammonia product generation system. The on-board ammonia product generation system includes a nitrogen generator coupled to an air intake and a hydrogen generation cell coupled to a source of a hydrogen-containing compound. The on-board ammonia product generation system also includes a catalyst combining reactor coupled to each of the nitrogen generator and the hydrogen generation cell. The SCR system also includes a reduction chamber coupled to each of the $NO_x$ generator and the on-board ammonia product generation system. The reduction chamber is configured to receive on-board generated ammonia product from the catalyst combining reactor and from the $NO_x$ generator for conversion of the $NO_x$ into at least $H_2O$ and nitrogen.

In another embodiment the system is an on-board ammonia product generation system. An embodiment of the on-board ammonia product generation system includes a nitrogen generator coupled to an air source inlet such that the nitrogen generator is configured to remove oxygen from air. The on-board ammonia product generation system also includes a hydrogen generation cell coupled to a hydrogen source inlet such that the hydrogen generation cell is configured to separate hydrogen from a hydrogen-containing compound. An example of a hydrogen containing compound is natural gas, although other hydrogen-containing compounds may be used. The on-board ammonia product generation system also includes a catalyst combining reactor coupled to each of the nitrogen generator and the hydrogen generation cell. The catalyst combining reactor is configured to generate the ammonia product from nitrogen from the nitrogen generator and hydrogen from the hydrogen generation cell. Other embodiments of the system are also described.

Embodiments of a method are described. In one embodiment, the method is a method of reducing $NO_x$. A method of reducing $NO_x$ in emissions from a $NO_x$ generator includes generating an ammonia product at a location on-site with the $NO_x$ generator. The method also includes introducing emissions including $NO_x$ from the $NO_x$ generator into a reduction chamber and introducing the ammonia product into the reduction chamber. In accordance with this method, the ammonia product reacts with the emissions to reduce the $NO_x$ within the emissions. In one embodiment, generating the ammonia product includes generating nitrogen from air, generating hydrogen from a hydrogen-containing compound, and combining the nitrogen and the hydrogen on-site at the $NO_x$ generator to form the ammonia product. Other embodiments of the method are also described.

Other aspects and advantages of embodiments of the present invention will become apparent from the following detailed description, taken in conjunction with the accompanying drawings, which are illustrated by way of example of the various principles and embodiments of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although certain functionality is described herein with respect to each of the illustrated components of the selective catalytic reduction (SCR) system, other embodiments of the SCR may implement similar functionality using fewer or more components. Additionally, some embodiments of the SCR may implement more or less functionality than is described herein.

Figure 1:
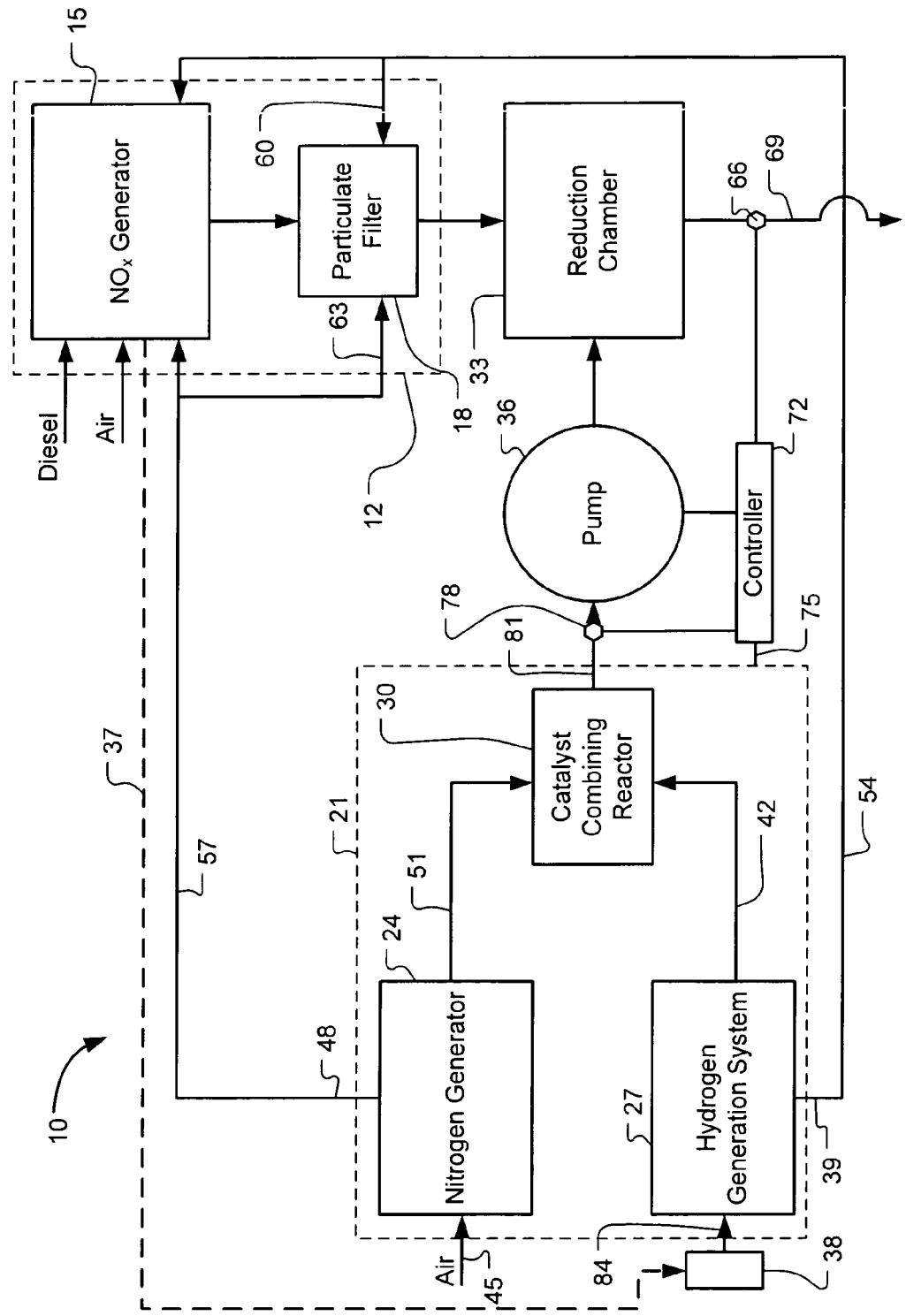
FIG. 1 illustrates a schematic block diagram of an embodiment of a selective catalytic reduction (SCR) system.

FIG. 1 illustrates a schematic block diagram of an embodiment of the selective catalytic reduction (SCR) system 10. The SCR system 10 includes a $NO_x$ source 12 having a $NO_x$ generator 15 and a particular filter 18. A $NO_x$ generator 15 and particulate filter 18 can be provided by a conventional diesel engine and an associated particulate filter of a motor vehicle. Alternatively, the $NO_x$ generator 15 and particulate filter 18 may be any portable or stationary internal combustion engine and associated filter in any application, whether it is used in a power plant, as a power source to run machinery, or to power any motor vehicle. The $NO_x$ generator 15 receives, for example, diesel fuel and air intake to perform the combustion.

The SCR system 10 also includes an on-board ammonia product generation system 21. The on-board ammonia product generation system 21 includes a nitrogen generator 24 and a hydrogen generation cell 27. The nitrogen generator 24 and hydrogen generation cell 27 are each coupled to a catalyst combining reactor 30. The catalyst combining reactor 30 has a catalytic reactor for combining nitrogen and hydrogen received from the nitrogen generator 24 and the hydrogen generation cell 27. A catalytic reaction in the catalyst combining reactor 30 forms ammonia ($NH_3$) or another ammonia product such as urea. The performance of the catalytic reaction in the catalyst combining reactor 30 may depend on several factors, including the pressure, the temperature, and the type of catalyst that is used.

A reduction chamber 33 is coupled to each of the $NO_x$ source 12 and the on-board ammonia product generation system 21. The reduction chamber 33 receives the $NO_x$ and ammonia product from the $NO_x$ source 12 and the on-board ammonia product generation system 21, respectively. A pump 36 may be coupled between the catalyst combining reactor 30 and the reduction chamber 33 in order to pump the ammonia product from the catalyst combining reactor 30 into the reduction chamber 33. Other embodiments may omit the pump 36 or implement another mechanism to move the ammonia product from the catalyst combining reactor 30 to the reduction chamber 33. In any case, the $NO_x$ and the ammonia product react in the reduction chamber 33 to produce at least nitrogen ($N_2$) and $H_2O$, for example, in the form of water.

FIG. 1 shows an embodiment having an $H_2O$ line 37 (shown dashed) coupled between the $NO_x$ generator 15 and the hydrogen generation cell 27 to deliver $H_2O$ from the $NO_x$ generator 15 to the hydrogen generation cell 27. Since one of the products of combustion in a diesel engine is steam, a heat exchanger (not shown) can be incorporated to convert the steam into water. Regardless of the exact form, the $H_2O$ can be supplied to the hydrogen generation cell 27 to provide a water source for the hydrogen generation cell 27. In some embodiments, the $H_2O$ line 37 is the only water source for the hydrogen generation cell 27. Alternatively, a separate $H_2O$ source such as a water tank 38 may be coupled to the hydrogen generation cell 27 in addition to or instead of the $H_2O$ line 37. It should also be noted, though, that a water source which is derived from the $NO_x$ generator 15 may provide contaminated water (e.g., including $NO_x$) which may have to be pretreated in order to be suitable for use in the nitrogen generator 24 and/or the hydrogen generation system 27.

The hydrogen generation cell 27 includes an $H_2O$ electrolysis cell for separating oxygen from the $H_2O$ and leaving the hydrogen ($H_2$). $H_2O$ electrolysis cells are known and operate on the principle of applying a voltage across a membrane that is contacted by the $H_2O$. The electrical potential supplies enough energy to the water molecules at the water-membrane interface to cause the bonds between the hydrogen and oxygen to break. Thus, the oxygen is released and can be separated and expelled through an outlet 39. The hydrogen ($H_2$) is directed through a hydrogen line 42 into the catalyst combining reactor 30. In one embodiment, the hydrogen generation cell 27 operates at a temperature within a range of about 30° to 850° C., although other embodiments may operate at other temperatures.

The nitrogen generator 24 may have one or more of a variety of separators including a solid electrolyte oxygen separator (SEOS), a polymeric membrane electrolyte oxygen separator, and a pressure swing absorption (PSA) oxygen separator. The polymeric membrane electrolyte oxygen separator and the PSA oxygen separator, when used by themselves are each typically less effective than the SEOS. Thus, the nitrogen generator 24 may include a combination of two or more separators such as a PSA and a SEOS, for example. Any combination of oxygen separators may be utilized in order to separate oxygen from air and supply nitrogen to the catalyst combining reactor 30. In one embodiment, the nitrogen generation cell 27 operates at a temperature within a range of about 300° to 850° C. and, more specifically within a range of about 550° to 750° C., although other embodiments may operate at other temperatures.

In practice, air may be supplied through an air intake 45 from the atmosphere to the nitrogen generator 24, for example. The nitrogen generator 24 may utilize one or more of technologies referred to above to separate oxygen from the nitrogen in air from the atmosphere. For example, in PSA technology, a zeolite material may be utilized to selectively adsorb the nitrogen from the air. Other technologies include polymeric membranes or solid state substrates that receive nitrogen and facilitate removal of the nitrogen through electrolysis after it has been received on the substrate. The remaining gas, a majority of which is oxygen ($O_2$), can be expelled through an outlet 48 from the nitrogen generator. An electrical potential is used to separate the nitrogen ($N_2$) from the zeolite or other substrate in an electrolysis reaction. The $N_2$ may be sent via the nitrogen line 51 out of the nitrogen generator 24 to the catalyst combining reactor 30 for a combining reaction with the hydrogen ($H_2$) from the hydrogen generation cell 27, as described above.

Since the hydrogen generation cell 27 and the nitrogen generator 24 each expel oxygen, some or all of this oxygen can be utilized to improve efficiency in the $NO_x$ generator 15. An oxygen line 54 from the hydrogen generation cell 27 to the $NO_x$ generator 15 and an oxygen line 57 from the nitrogen generator 24 to the $NO_x$ generator 15 may provide a supplemental quantity of oxygen to the fuel and air to be combusted in the $NO_x$ generator 15. One or the other, or both, of these lines 54, 57 can supply oxygen and increase the overall oxygen proportion in the gases to be combusted. These gases to be combusted might otherwise be solely supplied by atmospheric air, which has a relatively large amount of nitrogen, through an air intake of the $NO_x$ generator 15. By increasing the percentage of oxygen in the combustion components, the overall percentage of nitrogen in the combustion components is reduced. Therefore, supplying oxygen from the hydrogen generation cell 27 and the nitrogen generator 24 aids in reducing the $NO_x$ emissions from the $NO_x$ generator 15. Furthermore, combustion of the fuel in the $NO_x$ generator 15 may be more complete, and thus the amount of particulate in the emissions will be reduced.

In an embodiment of the SCR system, alternative or supplemental oxygen lines 60, 63 may connect the oxygen lines 54, 57 to supply oxygen from the hydrogen generation cell 27 and/or the nitrogen generator 24 to the particulate filter 18. Because of the high temperatures within the particulate filter 18, the supplied oxygen from the hydrogen generation cell 27 and the nitrogen generator 24 reacts with unburned particles for a cleaning effect. This supply of $O_2$ from the hydrogen generation cell 27 and/or the nitrogen generator 24 need not be constant. In one embodiment, the $O_2$ lines 54, 57 are not coupled directly with the $NO_x$ generator 15 to contribute to the gases to be combusted for engine power. Rather, the $O_2$ may be periodically injected through oxygen lines 60 and 63 into the particulate filter 18 in order to react with unburned fuel particulates in the filter 18. In this way, those particulates are burned and/or become volatile so that these otherwise unburned particles are carried downstream and expelled into the reduction chamber with the other emissions, instead of collecting as a residue of unburned particulates in the filter 18. Otherwise, the unburned fuel particulates build up more quickly and the life of the particulate filter 18 is shorter. In this manner, injecting the oxygen from one or both of the nitrogen generator 24 and the hydrogen generation cell 27 through the lines 54, 57, 60, and 63 may extend the life of the particulate filter 18.

The illustrated SCR system 10 also includes a sensor 66 located in an exhaust line 69 that is coupled to the reduction chamber 33 for exhausting emissions from the reduction chamber 33. The sensor 66 senses at least one component (e.g. $NO_x$) of the emissions and generates a feedback signal to a controller 72. The feedback signal indicates a level of the component in the emissions to the controller 72. The controller 72 is operably connected to the ammonia generation system 21 as indicated by control line 75. Alternatively, the controller 72 and/or sensor 66 may be included as part of the ammonia generation system 21. In any case, the controller 72 is configured to adjust a rate of generation of the ammonia product based on the feedback signal in order to control a level of the $NO_x$ in the emissions.

The sensor 66 may be a $NO_x$ sensor or an ammonia sensor for detecting a level of ammonia ($NH_3$) in the emissions. In this regard, the detection of a level of $NH_3$ may be an indication that excess $NH_3$ is being injected into the reduction chamber 33 such that there is not enough $NO_x$ to react with all of the $NH_3$. On the other hand, if the sensor 66 is an ammonia sensor and the sensor 66 does not detect ammonia in the emissions of exhaust line 69, then it is possible that insufficient levels of ammonia are being injected into the reduction chamber 33. Other sensors and other sensor arrangements may be utilized to accomplish the same or similar results. Generally, the goal is to detect a level of $NO_x$ either directly or by detection of another component. When the $NO_x$ is detected indirectly through detection of another component, a calculation may be implemented to determine the level of $NO_x$ in the emissions. Based on the feedback signal and the results of any calculation performed in the controller 72, one or more components of the on-board ammonia generation system 21 is controlled to increase $NO_x$ reduction in the emissions. Excess production of ammonia and/or either of its constituent parts from which it is generated can also be avoided through sensors and feedback to the controller 72.

In one embodiment, the controller 72 is operably connected to the pump 36 in order to control and/or adjust the amount of $NH_3$ being moved from the catalyst combining reactor 30 into the reduction chamber 33. The controller 72 is also operably connected to the on-board ammonia generation system 21, as described above. In some embodiments, the controller 72 may be operably connected with one or more of the nitrogen generator 24 and the hydrogen generation cell 27 in order to regulate the levels of nitrogen and hydrogen being produced and fed into the catalyst combining reactor 30. Another sensor 78 may be placed in the ammonia product line 81 that connects the catalyst combining reactor 30 with the reduction chamber 33. The sensor 78 may detect excess nitrogen or excess hydrogen, for example, and provide feedback to the controller 72. In this way, the controller 72 can additionally adjust the level of nitrogen and the level of hydrogen being produced based on feedback from the sensor 78 in the ammonia product line 81.

While the SCR system has been described with regard to a diesel engine, for example, it is to be understood that the SCR system can be implemented with any internal combustion engine and may include one or more of the features described herein. Furthermore, it is to be understood that while the SCR system has been described with regard to the ammonia product and specifically with regard to the production of ammonia ($NH_3$) the SCR system can also be utilized in conjunction with an on-board urea generation system since ammonia is a major component or derivative of urea, or another type of ammonia product generation system.

As shown in FIG. 1, and as described with regard to SCR system 10 above, the on-board ammonia product generation system 21 includes the nitrogen generator 24 the hydrogen generation cell 27 and the catalyst combining reactor 30. However, the on-board ammonia generation system 21 may be a self-contained unit supplied separately from any internal combustion engine. Although certain functionality is described herein with respect to each of the illustrated components of the on-board ammonia product generation system 21, other embodiments of the on-board ammonia product generation system 21 may implement similar functionality using fewer or more components. Additionally, some embodiments of the on-board ammonia product generation system 21 may implement more or less functionality than is described herein.

The on-board ammonia product generation system 21 includes the air inlet 45 that supplies air to the nitrogen generator 24. The on-board ammonia product generation system 21 also includes an $H_2O$ inlet 24 for feeding $H_2O$ to the hydrogen generation cell 27. The $H_2O$ inlet 84 may be connected to the $H_2O$ line 37 described above. Alternatively, the separate water source 38 may be provided as part of the on-board ammonia product generation system 21. It is to be understood that the on-board ammonia product generation system 21 may further include the pump 36 and one or more of the oxygen lines 54, 57, 60, and 63. Still further the ammonia product generation system 21 may include one or more of the controller 72, sensors 66, 78, and connections to the various components of the overall SCR system 10 described above. In this way the on-board ammonia product generation system 21 can be installed in a motor vehicle at the time of manufacture or can be retrofitted to an existing motor vehicle to provide $NO_x$ reduction. In this regard, it is to be understood that by inclusion of the on-board ammonia product generation system 21 any internal combustion engine can be provided with additional oxygen being injected for combustion, and/or oxygen can be injected into the particulate filter for cleaning purposes, as described above. Also, at least some embodiments of the on-board ammonia product generation system 21 reduce $NO_x$ emissions while at the same time eliminating the need for replenishment of a liquid ammonia supply that has been consumed. This is because the on-board ammonia product generation system 21 has its own nitrogen generator 24, its own hydrogen generation cell 27, and its own catalyst combining reactor 30 for generating the ammonia product on-board.

Figure 2:
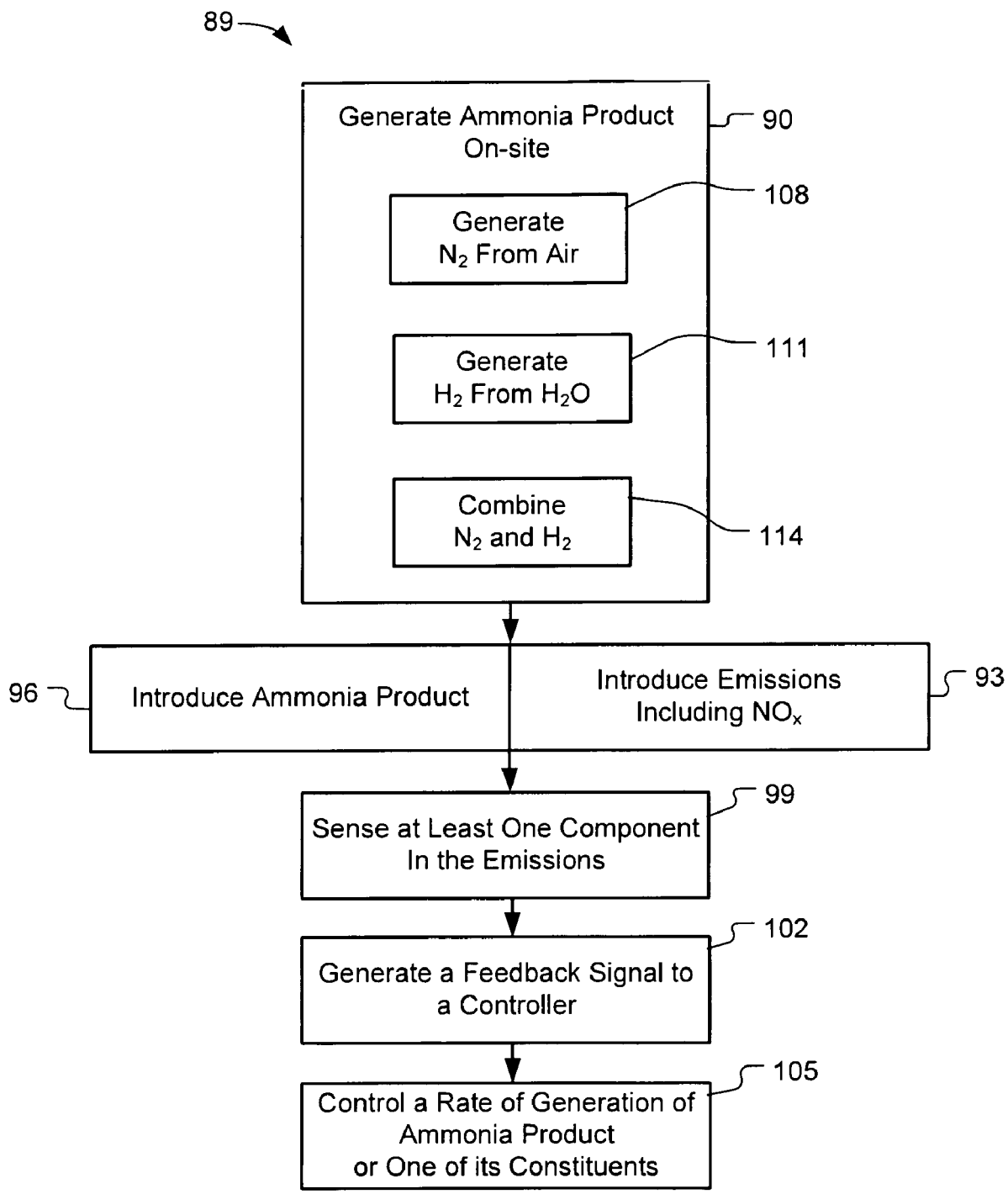
FIG. 2 illustrates a flow diagram of an embodiment of a method for reducing $NO_x$ in emissions from a $NO_x$ generator.

FIG. 2 illustrates a flow diagram of an embodiment of a method 89 for reducing $NO_x$ in emissions from the $NO_x$ generator 15. Although certain functionality is described herein with respect to each of the illustrated operations of the method 89 of reducing $NO_x$ in emissions from the $NO_x$ generator 15, other embodiments of the method 89 of reducing $NO_x$ in emissions from the $NO_x$ generator 15 may implement similar functionality using fewer or more operations. Additionally, some embodiments of the method 89 of reducing $NO_x$ in emissions from the $NO_x$ generator 15 may implement more or less functionality than is described herein. Also, embodiments of the method 89 may be implemented with other systems that may have components that are different from those described herein. Therefore, the description of the method 89 in conjunction with the SCR system 10 of FIG. 1 is merely an example, and other embodiments of the method 89 may be implemented in conjunction with other types of systems.

The method 89 includes generating an ammonia product at a location on-site with the $NO_x$ generator 15, as indicated at block 90. The method 89 also includes introducing emissions including $NO_x$ from a $NO_x$ generator 15 into the reduction chamber 33, as indicated at block 93. The ammonia product is also introduced into the reduction chamber 33. Introducing the ammonia product may be done before, after, or at the same time as introducing the emissions including $NO_x$. The method 89 also includes sensing at least one component of the emissions, as indicated at block 99, and generating a feedback signal to the controller 72 to indicate a level of the component in the emissions, as indicated at block 102. Then the controller 72 is operated to control and/or adjust a rate of generation of the ammonia product or any of its constituent components, as indicated at block 105. Thus, the controller 72 can utilize the feedback signal to adjust and control the level of $NO_x$ in the emissions.

In accordance with the method 89 of reducing $NO_x$ in emissions from the $NO_x$ generator, the ammonia product can be generated on-board or on-site with the $NO_x$ generator 15 by generating nitrogen from air as indicated at block 108, generating hydrogen from water as indicated at block 111, and combining the nitrogen and the hydrogen on-site at the $NO_x$ generator 15 to form the ammonia product, as indicated at block 114. In this way, the need to repeatedly replenish a supply of ammonia that has been depleted is avoided.

Embodiments of the method 89 may be practiced in portable or stationary applications. An example of a portable application is reducing $NO_x$ from emissions of an internal combustion engine in a motor vehicle. An example of a stationary application is reducing $NO_x$ from emissions of an on-site power generator to provide primary or secondary power to a building.

Other embodiments of the method 89 of reducing $NO_x$ also may include introducing water from the $NO_x$ generator into the hydrogen generation cell. Additionally, some embodiments of the method 89 include introducing oxygen from at least one of the nitrogen generator 24 and the hydrogen generation cell 27 into at least one of the $NO_x$ generator 15 and a particulate filter 18 coupled to the $NO_x$ generator 15.

Figure 3:
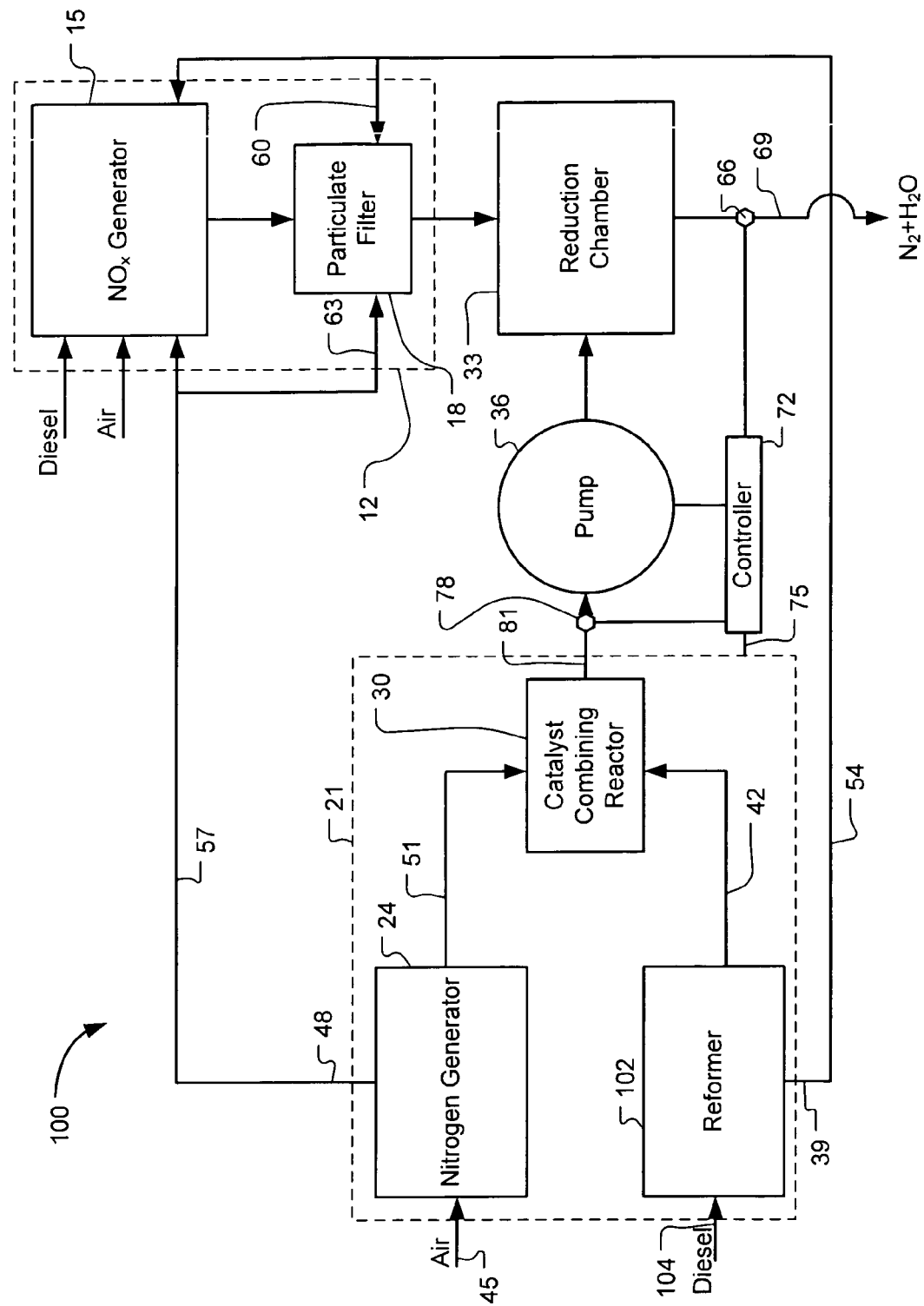
FIG. 3 illustrates a schematic block diagram of another embodiment of a selective catalytic reduction (SCR) system.

FIG. 3 illustrates a schematic block diagram of another embodiment of a selective catalytic reduction (SCR) system 100. In many aspects, the SCR system 100 of FIG. 3 is identical or substantially similar to the SCR system 10 of FIG. 1. However, in at least one aspect, the SCR system 100 differs from the SCR system 10 because the SCR system 100 includes a reformer 102 to generate the hydrogen from the catalyst combining reactors 30. The reformer 102 may have a diesel intake 104 or may use another type of combustible material to generate the hydrogen.

In general, the reformer 102 operates to partially oxidize a combustible material that contains or primarily contains hydrogen and/or carbon. In one embodiment, the material is diesel fuel. Other embodiments may use another type of carbon- or hydrogen-containing material. Although various types of reformers may be used to generate the hydrogen, at least some embodiments use a gliding electric arc reformer. Details of embodiments of a gliding electric arc reformer are available in U.S. Pat. Nos. 5,993,761 and 6,007,742. Thus, in one embodiment, the SCR system includes a hydrogen generation cell with a reformer to generated hydrogen from a hydrogen-containing material through catalytic reformation, plasma reformation, or other types of reformation.

Reference throughout this specification to "one embodiment," "an embodiment," or similar language means that the described feature, operation, structure, or characteristic may be implemented in at least one embodiment. Thus, the phrases "in one embodiment," "in an embodiment," and similar phrases throughout this specification may, but do not necessarily, refer to the same embodiment.

Furthermore, the described features, operations, structures, or characteristics of the described embodiments may be combined in any suitable manner. Hence, the numerous details provided here, such as examples oxygen separators, combination of components that may be included in the on-board ammonia generation system, and the particulars of how many and which lines supply water or oxygen from one part of the systems to another, and so forth, provide an understanding of several embodiments of the systems and methods that are within the spirit and scope of the invention. However, some embodiments may be practiced without one or more of the specific details, or with other features operations, components, materials, and so forth. In other instances, well-known structures, materials, or operations are not shown or described with reference to the figures for the sake of brevity and clarity.

Although specific embodiments have been described and illustrated, the invention is not to be limited to the specific forms or arrangements of parts so described and illustrated. The scope of the invention is to be defined by the claims appended hereto and their equivalents.

What is claimed is:

1. A selective catalytic reduction (SCR) system, comprising:
   a $NO_x$ generator;
   an on-board ammonia product generation system, the on-board ammonia product generation system comprising:
      a nitrogen generator coupled to an air intake;
      a hydrogen generation cell coupled to a source of a hydrogen-containing compound; and
      a catalyst combining reactor coupled to each of the nitrogen generator and the hydrogen generation cell;
   a reduction chamber coupled to each of the $NO_x$ generator and the on-board ammonia product generation system, the reduction chamber to receive on-board generated ammonia product from the catalyst combining reactor and $NO_x$ from the $NO_x$ generator for conversion of the $NO_x$ into at least $H_2O$ and nitrogen; and
   an $H_2O$ line coupled between the $NO_x$ generator and the hydrogen generation cell to deliver $H_2O$ from the $NO_x$ generator to the hydrogen generation cell.

2. The SCR system of claim 1, wherein the nitrogen generator comprises at least one separator of a solid electrolyte oxygen separator (SEOS), a polymeric membrane electrolyte nitrogen generator, and a pressure swing absorption nitrogen generator.

3. The SCR system of claim 2, wherein the nitrogen generator comprises a combination at least two separators.

4. The SCR system of claim 1, wherein the hydrogen generation cell comprises an $H_2O$ electrolysis cell.

5. The SCR system of claim 1, wherein the hydrogen generation cell comprises a reformer to generate hydrogen from a hydrogen-containing material through at least catalytic reformation or plasma reformation.

6. The SCR system of claim 1, further comprising an oxygen line coupled between the nitrogen generator and the $NO_x$ generator to deliver oxygen from the nitrogen generator to the $NO_x$ generator.

7. The SCR system of claim 1, further comprising an oxygen line coupled between the hydrogen generation cell and the $NO_x$ generator to deliver oxygen from the hydrogen generation cell to the $NO_x$ generator.

8. The SCR system of claim 1, further comprising:
a $NO_x$ sensor coupled to an exhaust of the reduction chamber to detect $NO_x$ in the exhaust of the reduction chamber; and
a controller coupled to the $NO_x$ sensor and to the ammonia product generation system to control generation of the on-board ammonia product based on the $NO_x$ detected in the exhaust of the reduction chamber.

9. The SCR system of claim 1, further comprising:
a particulate filter coupled to the $NO_x$ generator; and
an oxygen line coupled between the particulate filter and at least one of the nitrogen generator and the hydrogen generation cell to direct oxygen to the particulate filter.

10. The SCR system of claim 1, further comprising an injection pump coupled between the catalyst combining reactor and the reduction chamber to pump the ammonia product from the catalyst combining reactor into the reduction chamber.

11. The SCR system of claim 1, wherein the ammonia product comprises ammonia ($NH_3$).

12. An on-board ammonia product generation system, comprising:
a nitrogen generator coupled to an air source inlet, the nitrogen generator to remove oxygen from air;
a hydrogen generation cell coupled to a hydrogen source inlet to receive $H_2O$ from an on-board $NO_x$ generator, the hydrogen generation cell to separate hydrogen from a hydrogen-containing compound, wherein the hydrogen-containing compound comprises the $H_2O$ from the on-board $NO_x$ generator; and
a catalyst combining reactor coupled to each of the nitrogen generator and the hydrogen generation cell, the catalyst combining reactor to generate the ammonia product from nitrogen from the nitrogen generator and hydrogen from the hydrogen generation cell.

13. The on-board ammonia product generation system of claim 12, further comprising an on-board water source coupled to the hydrogen source inlet of the hydrogen generation cell to supply water in addition to the $H_2O$ from the on-board $NO_x$ generator.

14. The on-board ammonia product generation system of claim 12, wherein the nitrogen generator comprises a solid electrolyte oxygen separator (SEOS).

15. The on-board ammonia product generation system of claim 12, wherein the nitrogen generator comprises a polymeric membrane electrolyte nitrogen generator.

16. The on-board ammonia product generation system of claim 12, wherein the nitrogen generator comprises a pressure swing absorption nitrogen generator.

17. The on-board ammonia product generation system of claim 12, wherein the nitrogen generator comprises a combination of at least two distinct separators for separating nitrogen from oxygen in air.

18. The on-board ammonia product generation system of claim 12, further comprising an injection pump coupled to the catalyst combining reactor to pump the ammonia product out of the catalyst combining reactor.

19. The on-board ammonia product generation system of claim 12, wherein the ammonia product comprises ammonia ($NH_3$).

20. A method of reducing $NO_x$ in emissions from a $NO_x$ generator, the method comprising:
generating an ammonia product at a location on-site with the $NO_x$ generator, wherein generating the ammonia product comprises introducing water from the $NO_x$ generator into a hydrogen generation cell;
introducing emissions including $NO_x$ from the $NO_x$ generator into a reduction chamber; and
introducing the ammonia product into the reduction chamber, wherein the ammonia product reacts with the emissions to reduce the $NO_x$ within the emissions.

21. The method of claim 20, wherein generating the ammonia product comprises:
generating nitrogen from air;
generating hydrogen from a hydrogen-containing compound; and
combining the nitrogen and the hydrogen on-site at the $NO_x$ generator to form the ammonia product.

22. The method of claim 21, further comprising:
sensing at least one component of the emissions;
generating a feedback signal to a controller to indicate a level of the component in the emissions; and
changing a rate of generation of the ammonia product based on the feedback signal to control a level of the $NO_x$ in the emissions.

23. The method of claim 20, further comprising introducing oxygen from at least one of a nitrogen generator and a hydrogen generation cell into at least one of the $NO_x$ generator and a particulate filter coupled to the $NO_x$ generator.

24. A selective catalytic reduction (SCR) system, comprising:
a $NO_x$ generator;
a particulate filter coupled to the $NO_x$ generator;
an on-board ammonia product generation system, the on-board ammonia product generation system comprising:
a nitrogen generator coupled to an air intake;
a hydrogen generation cell coupled to a source of a hydrogen-containing compound; and
a catalyst combining reactor coupled to each of the nitrogen generator and the hydrogen generation cell;
a reduction chamber coupled to each of the $NO_x$ generator and the on-board ammonia product generation system, the reduction chamber to receive on-board generated ammonia product from the catalyst combining reactor and $NO_x$ from the $NO_x$ generator for conversion of the $NO_x$ into at least $H_2O$ and nitrogen; and
an oxygen line coupled between the particulate filter and the on-board ammonia product generation system to direct oxygen from the on-board ammonia product generation system to the particulate filter.

25. The SCR system of claim 24, wherein the oxygen line is coupled between the particulate filter and the nitrogen generator to direct the oxygen from the nitrogen generator to the particulate filter.

26. The SCR system of claim 24, wherein the oxygen line is coupled between the particulate filter and the hydrogen generation cell to direct the oxygen from the hydrogen generation cell to the particulate filter.

27. The SCR system of claim 24, further comprising an $H_2O$ line coupled between the $NO_x$ generator and the hydrogen generation cell to deliver $H_2O$ from the $NO_x$ generator to the hydrogen generation cell.

28. The SCR system of claim 24, wherein the nitrogen generator comprises at least one separator of a solid electrolyte oxygen separator (SEOS), a polymeric membrane electrolyte nitrogen generator, and a pressure swing absorption nitrogen generator.

29. The SCR system of claim 28, wherein the nitrogen generator comprises a combination at least two separators.

30. The SCR system of claim 24, wherein the hydrogen generation cell comprises an $H_2O$ electrolysis cell.

31. The SCR system of claim 24, wherein the hydrogen generation cell comprises a reformer to generate hydrogen from a hydrogen-containing material through at least catalytic reformation or plasma reformation.

32. The SCR system of claim 24, further comprising an oxygen line coupled between the nitrogen generator and the $NO_x$ generator to deliver oxygen from the nitrogen generator to the $NO_x$ generator.

33. The SCR system of claim 24, further comprising an oxygen line coupled between the hydrogen generation cell and the $NO_x$ generator to deliver oxygen from the hydrogen generation cell to the $NO_x$ generator.

34. The SCR system of claim 24, further comprising:
a $NO_x$ sensor coupled to an exhaust of the reduction chamber to detect $NO_x$ in the exhaust of the reduction chamber; and
a controller coupled to the $NO_x$ sensor and to the ammonia product generation system to control generation of the on-board ammonia product based on the $NO_x$ detected in the exhaust of the reduction chamber.

35. The SCR system of claim 24, further comprising an injection pump coupled between the catalyst combining reactor and the reduction chamber to pump the ammonia product from the catalyst combining reactor into the reduction chamber.

36. The SCR system of claim 24, wherein the ammonia product comprises ammonia ($NH_3$).

* * * * *